(12) United States Patent
Gerard et al.

(10) Patent No.: US 11,208,564 B2
(45) Date of Patent: *Dec. 28, 2021

(54) IMPREGNATION PROCESS FOR A FUNCTIONAL FIBROUS SUBSTRATE, A LIQUID MONOMER SYRUP FOR THE IMPREGNATION PROCESS, ITS METHOD OF POLYMERIZATION AND STRUCTURED ARTICLE OBTAINED THEREOF

(71) Applicant: Arkema France, Colombes (FR)

(72) Inventors: Pierre Gerard, Denguin (FR); Michel Glotin, Saint-Cloud (FR); Sebastien Taillemite, Chaville (FR)

(73) Assignee: ARKEMA FRANCE, Colombes (FR)

( * ) Notice: Subject to any disclaimer, the term of this patent is extended or adjusted under 35 U.S.C. 154(b) by 180 days.

This patent is subject to a terminal disclaimer.

(21) Appl. No.: 15/113,184

(22) PCT Filed: Jan. 22, 2015

(86) PCT No.: PCT/EP2015/051282
§ 371 (c)(1),
(2) Date: Jul. 21, 2016

(87) PCT Pub. No.: WO2015/110549
PCT Pub. Date: Jul. 30, 2015

(65) Prior Publication Data
US 2017/0002207 A1    Jan. 5, 2017

(30) Foreign Application Priority Data

Jan. 22, 2014  (FR) .................. FR14.50543

(51) Int. Cl.
| | |
|---|---|
| *C09D 4/00* | (2006.01) |
| *C08J 5/06* | (2006.01) |
| *B05D 3/00* | (2006.01) |
| *C08J 5/04* | (2006.01) |
| *C08J 5/24* | (2006.01) |

(52) U.S. Cl.
CPC .............. *C09D 4/00* (2013.01); *B05D 3/007* (2013.01); *C08J 5/042* (2013.01); *C08J 5/06* (2013.01); *C08J 5/24* (2013.01); *B05D 2256/00* (2013.01); *B05D 2502/00* (2013.01); *C08J 2333/12* (2013.01)

(58) Field of Classification Search
CPC ........... C09D 4/00; C08J 5/06; C08J 2333/12; B05D 2502/00; Y10T 428/249948
See application file for complete search history.

(56) References Cited

U.S. PATENT DOCUMENTS

| | | | |
|---|---|---|---|
| 3,287,155 A | 11/1966 | Munn | |
| 4,268,639 A * | 5/1981 | Seidel ................. | A61L 24/06 525/303 |
| 5,773,146 A * | 6/1998 | Lawton ................ | C03C 25/28 428/392 |
| 6,191,229 B1 | 2/2001 | Sasbe et al. | |
| 2008/0044654 A1* | 2/2008 | Cadoret .............. | D01F 1/10 428/394 |
| 2011/0112210 A1* | 5/2011 | Vogt .................... | A61L 24/0015 523/116 |
| 2011/0237718 A1* | 9/2011 | Yoshiwara .......... | C08G 61/08 524/114 |
| 2011/0275752 A1 | 11/2011 | Van Boxtel | |
| 2013/0224470 A1* | 8/2013 | Vautard ............... | C08J 5/06 428/300.1 |
| 2014/0256850 A1 | 9/2014 | Gerard et al. | |
| 2014/0256855 A1* | 9/2014 | Wakabayashi ....... | D06M 15/55 523/456 |
| 2019/0151511 A1* | 5/2019 | Bailey ................. | A61L 27/26 |

FOREIGN PATENT DOCUMENTS

| | | | |
|---|---|---|---|
| GB | 972078 | 10/1964 | |
| WO | WO2009/112515 | 9/2009 | |
| WO | WO-2014013028 A1 * | 1/2014 | ........... C08F 265/06 |

OTHER PUBLICATIONS

Derwent Abstract for DE 1284083; Degussa; (Year: 1968).*
Torayca (Explanation of Product Code, Toray Carbon Fibers America, Inc., Retrieved on Nov. 15, 2019, Cached by Google on Dec. 17, 2004, pp. 1-3) (Year: 2004).*
Mondal, Ibrahim (Grafting of Methyl Acrylate and Methyl Methacrylate onto Jute fiber: Physico-Chemical Characteristics of the Grafted Jute; Journal of Engineered Fibers and Fabrics, vol. 8, Issue 3, 2013) (Year: 2013).*

(Continued)

*Primary Examiner* — Francisco W Tschen

(74) *Attorney, Agent, or Firm* — Buchanan Ingersoll & Rooney P.C.

(57) ABSTRACT

The present invention relates to an impregnation process for a functional fibrous substrate, a liquid composition for implementing this process and the obtained impregnated fibrous substrate. The impregnated functional fibrous substrate is suitable for manufacturing mechanical or structured parts or articles. In particular the present invention deals with an industrial process for impregnating a functional fibrous substrate or long functional fibers with a viscous liquid composition containing mainly monomer components. This viscous composition is called hereafter liquid monomer syrup. The invention concerns also a functional fibrous substrate pre-impregnated with said syrup which is useful for manufacturing mechanical or structured parts or articles. More particular the impregnation of functional fibrous substrate with the monomer syrup is achieved in a mould. The present invention concerns also manufacturing process for manufacturing mechanical or structured parts or articles and three-dimensional mechanical or structured parts obtained by this process.

26 Claims, No Drawings

(56) References Cited

OTHER PUBLICATIONS

Y, Thomas et.al., "Improvement of fibre/matrix bonding in carbon-fibre/acrylic composites by electron-irradiation: Concept of difunctional chemical coupling agent", Composites Science and Technology. vol. 52, No. 3, Jan. 1, 1994 (Jan. 1, 1994) pp. 299-307.

A. Kaul et. al., "Effect of bulk structure of amino silane primer on the strength and durability of aluminum/epoxy joints", Polymer Engineering & Science, vol. 26, No. 11, Jun. 1, 1986 (Jun. 1, 1986), pp. 768-775.

"Hexcel Selector Guide Industry", Apr. 29, 2013, retrieved from the Internet: URL: http://www.hexcel.com/resources/SelectorGuides/Industrial SelectorGuide.pdf.

NF EN 2597.

NF EN ISO 1172.

\* cited by examiner

IMPREGNATION PROCESS FOR A FUNCTIONAL FIBROUS SUBSTRATE, A LIQUID MONOMER SYRUP FOR THE IMPREGNATION PROCESS, ITS METHOD OF POLYMERIZATION AND STRUCTURED ARTICLE OBTAINED THEREOF

This application claims benefit, under U.S.C. § 119 or § 365 of PCT Application Number PCT/EP2015/051282, filed Jan. 22, 2015, and French Patent Application Number FR14.50543, filed Jan. 22, 2014, these documents being incorporated herein by reference.

FIELD OF THE INVENTION

The present invention relates to an impregnation process for a functional fibrous substrate, a liquid composition for implementing this process and the obtained impregnated fibrous substrate. The impregnated functional fibrous substrate is suitable for manufacturing mechanical or structured parts or articles.

In particular the present invention deals with an industrial process for impregnating a functional fibrous substrate or long functional fibers with a viscous liquid composition containing mainly monomer components. This viscous composition is called hereafter liquid monomer syrup. The invention concerns also a functional fibrous substrate preimpregnated with said syrup which is useful for manufacturing mechanical or structured parts or articles.

More particular the impregnation of functional fibrous substrate with the monomer syrup is achieved in a mould.

The present invention concerns also manufacturing process for manufacturing mechanical or structured parts or articles and three-dimensional mechanical or structured parts obtained by this process.

TECHNICAL PROBLEM

Mechanical or structured parts or articles that have to absorb high stresses during their use are widely manufactured from composite materials. A composite material is a macroscopic combination of two ore more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres or the other component which is wetted or impregnated and cured afterwards. Example for prepolymers or matrix material for thermoset polymers are unsatured polyesters, vinylesters, epoxy or phenolic ones.

A major disadvantage of a thermoset polymer matrix is its rigidity. The matrix cannot be easily shaped in other forms. Once the polymer has been cured the form is fixed. This makes also difficult the recycling of the thermoset composite material and manufactured mechanical or structured parts or articles comprising said thermoset composite material, which are burned in a cement plant or thrown into a waste dump.

Thermoplastic polymers consist of linear or branched polymers, which are not crosslinked. The thermoplastic polymers are heated in order to mix the constituents necessary for producing the composite material and to be cooled for setting. The limit in using thermoplastic polymers for the fabrication of composite materials is their high viscosity in the molten state in order to homogenously impregnating for example a fibrous substrate. The wetting or correct impregnation of the fibers by the thermoplastic polymer can only be achieved, if the thermoplastic resin is sufficiently fluid. In order to have a low viscosity or sufficient fluidity of the thermoplastic polymer the chain length or molecular mass shall be reduced. However a too low molecular weight has a negative impact on the performance of the composite material and on the mechanical or structured parts especially their mechanical properties as the deformation modulus.

Another way to reduce the viscosity in an important way of the thermoplastic polymer is to increase the temperature. Consequently the continuous working temperature is relatively high, above 200° C., increasing the economics costs of the composite material and mechanical or structured parts due to implication of high energy costs. Additionally thermoplastic polymers tend to degrade if the temperature is too high, which is especially true for semicrystalline thermoplastic polymers that have high melting points as for example polyamides such as PA6.6, polyethersulfon (PES), polyetherimid (PEI), polyetheretherketon (PEEK) or polyphenylene sulfide (PPS). This thermoinduced degradation yields to a decreasing molecular weight of the polymer matrix on the fibrous substrate important for the cohesion of the composite material and the mechanical or structured parts.

Another way for impregnating the fibrous substrate is to dissolve the thermoplastic polymer in an organic solvent. However this method requires a lot of solvent that has to be evaporated. There are environmental issues in using large quantities of solvent in term of energy and pollution.

These are the limits or disadvantages for the preparation of thermoplastic composite materials especially with fibrous reinforcements, the impregnation process for a fibrous substrate and the manufactured mechanical or structured parts or articles comprising said thermoplastic composite material.

Both technologies with thermoset polymers and thermoplastic polymers as matrix materials can use fibres as reinforcing material. In order to strengthen the adhesion between the matrix material that forms a continuous phase and the reinforcing material in form of fibres, the fibres are sized with a polymeric resin that is applied to the surface of the fibres. Adhesion in the sense of improving the bond between fibre and the polymeric matrix is important for the mechanical properties of the material.

However it is still important to increase the bond between matrix and fibres in order to increase the mechanical properties of manufactured mechanical or structured parts or article.

The objective of the present invention is to solve the disadvantages mentioned above.

One objective of the present invention is to have a structural part comprising a thermoplastic composite material with satisfying mechanical properties such as high stiffness and a young modulus of at least 8 GPa and an good adhesion between the thermoplastic matrix and the fibrous material meaning stress at break in a tensile test perpendicular to the fibre direction of at least 50 MPa.

Another objective of the present invention is to have a structural part comprising a thermoplastic composite material with a satisfying UV resistance.

The further objective of the present invention is to have a structural part comprising a thermoplastic composite material that can be transformed and shaped into form due to a certain flexibility.

Still another objective of the present invention is to wet completely, correctly and in a homogenous way the fibrous substrate during impregnation. Any defects of fiber wetting for example by bubbles and voids decrease the mechanical performance of the structural part and the adhesion between fibre and matrix.

Another objective of the present invention is to provide a process which can be carried out at low cost and is capable of large-scale manufacturing, to produce the structural parts comprising the thermoplastic composite material of the invention. In addition, the process should be easy and simple to carry out using commercially available components. Also the manufacturing of parts should be reproducible and fast meaning short cycle times.

BACKGROUND OF THE INVENTION

Prior Art

The document FR1374046 describes a process of polymerization of acrylic monomers especially methacrylic monomers from monomer-polymer syrups using a metal catalyst based on tin. Glass fibres are impregnated with a methanol solution of the tin calatyst. Afterwards the fibres are impregnated with a monomer-polymer syrup and then the composition is polymerized. No other functionality, except the tin catalyst, is present at the fibre surface, which is added in order to avoid presence of the tin catalyst in the non-used syrup for recycling it.

The document EP0796873 discloses a (meth)acrylic syrup, a process for for preparing the syrup and a process for preparing molding material containing the (meth)acrylic syrup. The main objective is having a syrup with excellent storage stability. The molding material might include a reinforcing material in form of fibres. However the fibres are not sized.

The document WO2009/112515 discloses fibres coated with a sizing composition. The sizing composition comprises a vinylester resin. The sized fibre is used in thermosetting polymers and thermoplastic polymers and especially to increase the adhesion between an unsaturated polyester or vinyl ester resin matrix and sized glass fibres. The document does not disclose an impregnation process of a fibrous substrate with a liquid monomer syrup or the specific composition of such a syrup.

The document WO2010/076006 discloses alkyl methacrylate/alkyl acrylate copolymers used a sizing for reinforcing fibres. The fibres are used in composites such as fibre reinforced thermoplastics, such as polyesters or polyamides.

In the prior no impregnation process for impregnating a fibrous substrate is described where the fibrous substrate and the liquid monomer syrup are brought into contact before the polymerization according to the present invention.

In the prior no manufacturing process for manufacturing mechanical or structured parts or articles is described including the impregnation process for impregnating a fibrous substrate with a liquid (meth)acrylic syrup and polymerization according to the present invention.

BRIEF DESCRIPTION OF THE INVENTION

Surprisingly it has been found that an impregnation process for impregnating a functional fibrous substrate, wherein said functional fibrous substrate is made of long fibres and said process comprises a step of impregnating said functional fibrous substrate with a liquid monomer syrup comprising:
a) at least a polymer (P),
b) a least monomer (A),
c) at least one initiator or initiating system for
starting the polymerization of the (meth)acrylic monomer, said liquid monomer syrup has a dynamic viscosity of a value in the range from 10 mPa*s to 10000 mPa*s, preferably from 50 mPa*s to 5000 mPa*s and advantageously from 100 mPa*s to 1000 mPa*s characterized that the fibrous substrate comprises an functionality having an IR absorption peak at a wave number between 1600 cm−1 and 1680 cm−1, yields to a complete and correct impregnation of the functional fibrous substrate and a strong bonding between the fibrous substrate and polymer matrix after polymerization.

Surprisingly it has also been discovered that an impregnation liquid monomer syrup for implementing the impregnation process for a functional fibrous substrate, said liquid monomer syrup comprises:
a) at least a polymer (P),
b) a least monomer (A),
c) at least one initiator or initiating system for
starting the polymerization of the (meth)acrylic monomer, said liquid monomer syrup has a dynamic viscosity of a value in the range from 10 mPa*s to 10000 mPa*s, preferably from 50 mPa*s to 5000 mPa*s and advantageously from 100 mPa*s to 1000 mPa*s, characterized that the fibrous substrate comprises an functionality having an IR absorption peak at a wave number between 1600 cm−1 and 1680 cm−1, yields to a complete and correct impregnation of the functional fibrous substrate and a strong bonding between the fibrous substrate and polymer matrix after polymerization.

Surprisingly it has also been discovered that a manufacturing process for manufacturing mechanical or structured parts or articles comprising following steps:
a) impregnating a functional fibrous substrate with a liquid monomer syrup,
b) polymerising the liquid monomer syrup impregnating said functional fibrous substrate
characterized that the fibrous substrate comprises an functionality having an IR absorption peak at a wave number between 1600 cm−1 and 1680 cm−1, yields to manufactured mechanical or structured parts or articles having satisfying mechanical properties by possessing a high stiffness and a young modulus of at least 8 GPa and and a strong bonding between the fibrous substrate and polymer matrix.

Additionally it has also been discovered that a three-dimensional mechanical or structured parts obtained by the manufacturing process possessing a high stiffness and a young modulus of at least 8 GPa, has nearly no defects as voids between the fibrous substrate and the matrix polymer and a strong bonding between the fibrous substrate and polymer matrix.

DETAILED DESCRIPTION OF THE INVENTION

According to a first aspect, the present invention relates to an impregnation process for impregnating a fibrous substrate, wherein said fibrous substrate is made of long fibres and said process comprises a step of impregnating said fibrous substrate with a liquid monomer syrup comprising:
a) a (meth)acrylic polymer,
b) a (meth)acrylic monomer,
c) at least one initiator or initiating system for
starting the polymerization of the (meth)acrylic monomer, said liquid monomer syrup has a dynamic viscosity of a value in the range from 10 mPa*s to 10000 mPa*s, preferably from 50 mPa*s to 5000 mPa*s and advantageously from 100 mPa*s to 1000 mPa*s, characterized that the fibrous substrate comprises an functionality having an IR absorption peak at a wave number between 1600 cm−1 and 1680 cm−1.

According to another aspect the impregnation process of the fibrous substrate of the present invention is made in a closed mold.

According to still another aspect the impregnation process of the fibrous substrate of the present invention is made with a liquid monomer syrup that comprises a polymer (P) which is a thermoplastic polymer.

By the term "fibrous substrate" as used are denoted fabrics, felts or nonwovens that may be in the form of strips, laps, braids, locks or pieces.

By the term "functional fibrous substrate" as used are denoted chemical functions that are not present in the basic material that makes the fibrous substrate. For example a carbon fibre that comprises a vinylic function or an epoxy function.

By the term "(meth)acrylic" as used is denoted all kind of acrylic and methacrylic monomers.

By the term "PMMA" as used are denoted homo- and copolymers of methylmethacrylate (MMA), for the copolymer of MMA the weight ratio of MMA inside the PMMA is at least 70 wt %.

By the term "monomer" as used is denoted is a molecule which can under go polymerization.

By the term "polymerization" as used is denoted the process of converting a monomer or a mixture of monomers into a polymer.

By the term "thermoplastic polymer" as used is denoted a polymer that turns to a liquid or becomes more liquid or less viscous when heated and that can take on new shapes by the application of heat and pressure.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "initiator" as used is denoted a chemical species that's reacts with a monomer to form an intermediate compound capable of linking successively with a large number of other monomers into a polymeric compound.

With regard to structured part or article this concerns a panel, a cover or a hull made of composite material or parts for aircrafts, for boats (hull and deck), rail cars (hatch, partition, body), and automotive parts (car body, hood, door.)

With regard to the polymer (P), it is a thermoplastic polymer. The thermoplastic polymer is preferably made of monomers comprising a double bound before polymerization.

Preferably the polymer (P) is a (metha)acrylic polymer.

With regard to the (metha)acrylic polymer, one could mention poly alkyl methacrylates or poly alkyl acrylates. In a preferred embodiment the (meth)acrylic polymer is poly methyl methacrylate (PMMA).

The term "PMMA" denotes a methyl methacrylate (MMA) homopolymer or a copolymer or mixtures thereof.

In one embodiment the homo- or copolymer of methyl methacrylate (MMA) comprises at least 70%, preferably at least 80%, advantageously at least 90% and more advantageously at least 95% by weight of methyl methacrylate.

In another embodiment the PMMA is a mixture of at least one homopolymer and at least one copolymer of MMA, or a mixture of at least two homopolymers or two copolymers of MMA with a different average molecular weight or a mixture of at least two copolymers of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth) acrylate. Preferably the comonomer is an alkyl acrylate in which the alkyl group has from 1 to 4 carbon atoms.

In a preferred embodiment the copolymer of methyl methacrylate (MMA) comprises from 70% to 99.7%, preferably from 80% to 99.7% advantageously from 90% to 99.7% and more advantageously from 90% to 99.5% by weight of methyl methacrylate and from 0.3% to 30%, preferably from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The weight average molecular weight of the (meth)acrylic polymer should be high, meaning larger than 50 000 g/mol, preferably larger than 100 000 g/mol.

The weight average molecular weight can be measured by size exclusion chromatography (SEC).

With regard to the monomer (A), the monomer is having at least one insaturation (double bound) that can be polymerized. Preferably the monomer (A) is chosen from (meth) acrylic monomer or vinyl monomers or mixtures thereof. Preferably the monomer (A) is liquid at least in the temperature range between 15° C. and 100° C. at 1013 mbar.

More preferably the monomer (A) is a (meth)acrylic monomer. The liquid monomer syrup then becomes a liquid (meth)acrylic syrup.

With regard to the (meth)acrylic monomer, the monomer is chosen from acrylic acid, methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

More advantageously the monomer is chosen (meth) acrylic monomer is chosen from methyl methacrylate, isobornyl acrylate or acrylic acid and mixtures thereof.

In a preferred embodiment at least 50 wt %, preferably at least 60 wt % of the monomer is methyl methacrylate.

In a more preferred embodiment at least 50 wt %, preferably at least 60 wt %, more preferably at least 70 wt % and advantageously at least 80 wt % and even more advantageously 90 wt % of the monomer is a mixture of methyl methacrylate with isobornyl acrylate and/or acrylic acid.

With regard to the functional fibrous substrate, one can mention fabrics, felts or nonwovens that may be in the form of strips, laps, braids, locks or pieces. The functional fibrous material can have different forms and dimensions either one dimensional, two dimensional or three dimensional. A fibrous substrate comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and more advantageously at least 5000, even more advantageously at least 6000 most advantageously at least 7500 and at most advantageously at least 10 000.

The two dimensional form are fibrous mats or non woven reinforcements or woven roving or bundles of fibers, which can also be braded. Even if these two dimensional forms have a certain thickness and therefore in principle a third dimension, they are considered as two dimensional according to the present invention.

The three dimensional form are for example stacked or folded fibrous mats or non woven reinforcements or bundles of fibers or mixtures thereof, an assembly of the two dimensional form in the third dimension.

The fibres of the fibrous material have a diameter between 0.005 µm and 100 µm, preferably between 1 µm and 50 µm, more preferably between 3 µm and 30 µm and advantageously between 5 µm and 25 µm.

Preferably the fibres of the fibrous material of the present invention are chosen from continuous fibres (meaning that the aspect ratio does not apply as for long fibres) for the one dimensional form, or long or continuous fibres forming the two or three dimensional form of the fibrous substrate.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsatured polyesters, epoxy resins and vinylesters.

The mineral fibers can also be chosen from glass fibers especially of type E, R or S2, carbon fibers, boron fibers or silica fibers.

The functional fibrous substrate of the present invention is chosen from vegetable fibers, wood fibers, animal fibers, mineral fibers, synthetic polymeric fibers, glass fibers, carbon fibers or mixtures thereof.

Preferably the functional fibrous substrate is chosen from mineral fibers.

The functional fibrous substrate according to the invention comprises at least one functionality having an IR absorption peak at a wave number between 1600 cm−1 and 1680 cm−1. Preferably this peak is at a wave number between 1615 cm−1 and 1680 cm−1, more preferably between 1620 cm−1 and 1670 cm−1 and advantageously between 1630 cm−1 and 1650 cm−1. This corresponds to an alkene or carbon double bond function.

Preferably the functional fibrous substrate according to the invention comprises at least two functionalities the first one having an IR absorption peak at a wave number between 1600 cm−1 and 1680 cm−1, preferably between 1615 cm−1 and 1680 cm−1, more preferably between 1620 cm−1 and 1670 cm−1 and advantageously between 1630 cm−1 and 1650 cm−1 and the second one having an IR absorption peak at a wave number between 1700 cm−1 and 1750 cm−1. Preferably this peak of the second functionality is at a wave number between 1720 cm−1 and 1750 cm−1. This corresponds to a carbonyl function and more specifically a carbonyl ester.

More preferably the functional fibrous substrate according to the invention comprises at least three functionalities the first one having an IR absorption peak at a wave number between 1600 cm−1and 1680 cm−1, preferably between 1615 cm−1 and 1680 cm−1, more preferably between 1620 cm−1 and 1670 cm−1 and advantageously between 1630 cm−1 and 1650 cm−1, the second one having an IR absorption peak at a wave number between 1700 cm−1 and 1750 cm−1 and the additional third functionality having an IR double absorption peak at a wave number between 1270 cm−1 and 1330 cm−1 centred around 1300 cm−1. This corresponds to a methyl group on an alkene or carbon double bond function.

With regard to the initiator or initiating system for starting the polymerization of the monomer (A) or the preferred (meth)acrylic monomer, one could mention initiators or initiating systems that are activated by heat.

The heat activated initiator is preferably a radical initiator.

With regard to the radical initiator, they can be chosen from diacyl peroxides, peroxy esters, dialkyl peroxides, peroxyacetals, hydro peroxides or azo compounds or mixtures thereof.

The initiator or initiating system for starting the polymerization of the monomer (A) or the preferred (meth)acrylic monomer is chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethyl-cyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azo-bis(2,4-dimethylvaleronitrile) or 4,4'-azo-bis(4-cyanopentanoic). It would not be departing from the scope of the invention to use a mixture of radical initiators chosen from the above list.

Preferably the initiator or initiating system for starting the polymerization of monomer (A) or the preferred (meth) acrylic monomer is chosen from peroxides having 2 to 20 carbon atoms The content of radical initiator with respect to the monomer (A) or the preferred (meth)acrylic monomer of the a liquid monomer syrup is from 100 to 50000 ppm by weight (50000 ppm=5 wt %), preferably between 200 and 40000 ppm by weight and advantageously between 300 and 30000 ppm.

The preferred (meth)acrylic monomer is typically one or more monomers as defined above with, optionally, a suitable inhibitor such as hydroquinone (HQ), methyl hydroquinone (MEHQ), 2,6-di-tertiary-butyl-4-methoxyphenol (Topanol O) and 2,4-dimethyl-6-tertiary-butyl phenol (Topanol A).

The inhibitor is present to prevent the monomer from spontaneously polymerising.

The liquid monomer syrup or the preferred liquid (meth) acrylic syrup comprises optionally also an activator for the polymerization.

In a preferred embodiment the liquid monomer syrup or the preferred liquid (meth)acrylic syrup comprises an activator for the polymerization.

Polymerisation activator or accelerator is chosen from tertiary amines such as N,N-dimethyl-p-toluidine (DMPT), N,N-dihydroxyethyl-p-toluidine (DHEPT), organic-soluble transition metal catalysts or mixtures thereof.

Advantageously the liquid monomer syrup contains no activators for catalytically accelerate the polymerization reaction as tin based compounds and especially tin chloride.

The content of the activator with respect to the monomer (A) and preferred (meth)acrylic monomer of the monomer syrup or the preferred liquid (meth)acrylic syrup is from 100 ppm to 10000 ppm (by weight), preferably from 200 ppm to 7000 ppm by weight and advantageously from 300 ppm to 4000 ppm.

The presence of activators or accelerators depends upon the final application. Where "cold-cure" is necessary or wished, an accelerator is usually necessary. Cold cure means that the polymerization takes place at ambient temperature, meaning less than 50° C. or preferably less than 40° C. By polymerization takes place at ambient temperature is meant the temperature where the polymerization starts. No external heating beyond this temperature is required (for example of the mold or in a oven) in order to start the polymerization. During the polymerization the temperature inside can achieve peaks that go beyond this temperature of polymerization.

However, for industrial applications the use of heat in "heat-cure" systems is also possible.

Another ingredient in the liquid resin can also be a chain-limiting agent in order to control the molecular weight, for example γ-terpinene or terpinolene, at contents of between 0 and 500 ppm and preferably between 0 and 100 ppm, with respect to the monomers of the mixture.

The impregnation process according to the invention for impregnating a functional fibrous substrate comprises a step of impregnating the functional fibrous substrate with a liquid monomer syrup and preferably with a liquid (meth)acrylic syrup.

A simple monomer or respectively a (meth)acrylic monomer or a monomer mixture or respectively (meth)acrylic monomer mixture as liquid monomer syrup or respectively liquid (meth)acrylic syrup is too liquid for the impregnation process of the present invention, especially for the correct and complete wetting and impregnation of the functional fibrous substrate. Therefore the viscosity has to be adapted by increasing it.

With regard to the liquid monomer syrup according to the invention that impregnates the fibrous substrate, it comprises a monomer (A) or a mixture of a monomers (A), a polymer (P) and at least one initiator or initiating system for starting the polymerization of the monomer (A).

According to the invention the viscosity is increased by using monomer (A) or a mixture of monomers (A) with dissolved polymer (P) or polymers (P). This solution is commonly referred to as "syrup" or "prepolymer".

Advantageously the liquid monomer syrup contains no additionally voluntary added solvent.

The polymer (P) is completely soluble in the monomer (A).

With regard to the liquid (meth)acrylic syrup according to a preferred embodiment of the the invention that impregnates the fibrous substrate, it comprises a (meth)acrylic monomer or a mixture of a (meth)acrylic monomers, a (meth)acrylic polymer and at least one initiator or initiating system for starting the polymerization of the (meth)acrylic monomer.

According to the invention the viscosity is increased by using (meth)acrylic monomer or a mixture of a (meth) acrylic monomers with dissolved (meth)acrylic polymer or (meth)acrylic polymers. This solution is commonly referred to as "syrup" or "prepolymer".

Advantageously the liquid (meth)acrylic syrup contains no additionally voluntary added solvent.

The (meth)acrylic polymer is completely soluble in the (meth)acrylic monomer.

This (meth)acrylic polymer is PMMA, meaning the homo- or copolymer of methyl methacrylate (MMA) or a mixture thereof as defined before.

This (meth)acrylic monomer is the same as defined before.

The monomer (A) or the preferred (meth)acrylic monomer in the liquid monomer syrup or the preferably liquid (meth)acrylic syrup present at least 40% by weight, preferably 50% by weight, advantageously 60% by weight and more advantageously 65% by weight of total liquid monomer syrup or the preferably liquid (meth)acrylic syrup in view of monomer (A) or the preferred (meth)acrylic monomer and polymer (P) or preferred (meth)acrylic polymer.

The monomer (A) or the preferred (meth)acrylic monomer in the liquid monomer syrup or the preferably liquid (meth)acrylic syrup present at most 90% by weight, preferably at most 85% by weight, advantageously at most 82% by weight and more advantageously at most 80% by weight of total liquid monomer syrup or the preferably liquid (meth) acrylic syrup in view of monomer (A) or the preferred (meth)acrylic monomer and polymer (P) or preferred (meth) acrylic polymer.

The polymer (P) or preferred (meth)acrylic polymer or polymers in the liquid monomer syrup or the preferably liquid (meth)acrylic syrup present at least 10% by weight, preferable at least 15%, advantageously at least 18% and more advantageously at least 20% by weight of total liquid monomer syrup or the preferably liquid (meth)acrylic syrup in view of monomer (A) or the preferred (meth)acrylic monomer and polymer (P) or preferred (meth)acrylic polymer.

The polymer (P) or preferred (meth)acrylic polymer or polymers in the liquid monomer syrup or the preferably liquid (meth)acrylic syrup present at most 60% by weight, preferable at most 50%, advantageously at most 40% and more advantageously at most 35% by weight of total liquid monomer syrup or the preferably liquid (meth)acrylic syrup.

The monomer (A) or the preferred (meth)acrylic monomer in the liquid (meth)acrylic syrup presents from 40% to 90% by weight, preferably from 50% to 90% by weight, advantageously from 55% to 85% by weight and more advantageously from 60% to 80% by weight of total liquid syrup in view of monomer (A) or the preferred (meth)acrylic monomer and polymer (P) or preferred (meth)acrylic polymer.

Accordingly polymer (P) or preferred (meth)acrylic polymer or polymers in the liquid monomer syrup or the preferably liquid (meth)acrylic syrup presents from 60% to 10% by weight, preferably from 50% to 10% by weight, advantageously from 15% to 45% by weight and more advantageously from 20% to 40% by weight of total liquid syrup in view of monomer (A) or the preferred (meth)acrylic monomer and polymer (P) or preferred (meth)acrylic polymer.

The dynamic viscosity of the liquid monomer syrup or the preferably liquid (meth)acrylic syrup is in a range from 10 mPa*s to 10000 mPa*s, preferably from 50 mPa*s to 5000 mPa*s and advantageously from 100 mPa*s to 1000 mPa*s. The viscosity of the syrup can be easily measured with a Rheometer or viscosimeter. The dynamic viscosity is measured at 25° C. The liquid (meth)acrylic syrup has a Newtonian behaviour, meaning no shear thinning, so that the dynamic viscosity is independent of the shearing in a rheometer or the speed of the mobile in a viscosimeter.

If the viscosity of the liquid monomer syrup or the preferably liquid (meth)acrylic syrup at a given temperature is too high for the impregnation process and for the correct impregnation, it is possible to heat the syrup in order to have a more liquid syrup within the before mentioned dynamic viscosity interval at the respective temperature during which the impregnation takes place for the sufficient wetting and correct and complete impregnation of the fibrous substrate.

The liquid syrup according to the present invention does not contain any additional solvent voluntary added.

The liquid monomer syrup and the preferably liquid (meth)acrylic syrup may comprise also other additives and fillers. A filler in the scope of the present invention is not considered as an additive.

All the additives and fillers can be added to the liquid monomer syrup or preferably the liquid (meth)acrylic syrup before the impregnation.

As additives one can mention organic additives as impact modifiers or block copolymers, thermal stabilizers, UV stabilizers, lubricants and mixtures thereof.

The impact modifier is in the form of fine particles having an elastomeric core and at least one thermoplastic shell, the size of the particles being in general less than 1 μm and advantageously between 50 and 300 nm. The impact modifier is prepared by emulsion polymerization. The impact modifier content in the liquid monomer syrup or the preferably liquid (meth)acrylic syrup is from 0 to 50 wt %, preferably from 0 to 25 wt %, and advantageously from 0 to 20% by weight.

As fillers one can mention carbon nanotubes or mineral charges including mineral nano charges (TiO2, silica).

The filler content in the liquid monomer syrup or the preferably liquid (meth)acrylic syrup is from 0 to 20 wt %.

An additional aspect according to the present invention is the impregnation process, for impregnating a functional fibrous substrate, wherein said functional fibrous substrate is made of long fibres and said process comprises a step of impregnating said functional fibrous substrate with a liquid monomer syrup comprising:
a) from 10 wt % to 59.99 wt % at least a polymer (P),
b) from 40 wt % to 89.99 wt % least monomer (A),
c) from 0.01 wt % to 5 wt % one initiator or initiating system for starting the polymerization of the (meth)acrylic monomer,
d) from 0 wt % to 1 wt % activator,
e) from 0 wt % to 20 wt % filler,
f) from 0 wt to 20 wt % additives.

The polymer (P), the monomer (A), the initiator or initiating system for starting the polymerization of the (meth)acrylic monomer, the activator, the filler and the additives are the same as described before.

Preferably the liquid monomer syrup; for the impregnation process, for impregnating the functional fibrous substrate, wherein said functional fibrous substrate is made of long fibres and said process comprises a step of impregnating said functional fibrous substrate; comprises:
a) from 10 wt % to 59.98 wt % at least a polymer (P),
b) from 40 wt % to 89.98 wt % least monomer (A),
c) from 0.01 wt % to 5 wt % one initiator or initiating system for starting the polymerization of the (meth)acrylic monomer,
d) from 0.01 wt % to 1 wt % activator,
e) from 0 wt % to 20 wt % filler,
f) from 0 wt to 20 wt % additives,
the components a) to f) add up to 100%.

Preferably the activator d) or accelerator is chosen from tertiary amines such as N,N-dimethyl-p-toluidine (DMPT), N,N-dihydroxyethyl-p-toluidine (DHEPT), organic-soluble transition metal catalysts or mixtures thereof.

Preferably the initiator or initiating system for starting the polymerization of the (meth)acrylic monomer is a peroxide or based on a peroxide. More preferably the peroxide is an organic peroxide. Advantageously the peroxide is benzoyl peroxide.

The reaction between the initiator (peroxide) and the activator (tertiary amine) at ambient temperature, meaning less than 50° C. or preferably less than 40° C., yield to a formation of a primary metal charge transfer complex, between the peroxide and the amine, followed by its decomposition to an imino radical, which is more favourable for the reaction with the functionality of the fibrous substrate, instead of a reaction coming simply from a thermal decomposition of the peroxide (thermal curing) or by using radiation (electro beam curing) for decomposition of the peroxide and starting the polymerization reaction.

Still another aspect of the present invention is a manufacturing process for manufacturing mechanical or structured parts or articles comprising following steps:
a) impregnating a functional fibrous substrate with a liquid monomer syrup,
b) polymerising the liquid monomer syrup impregnating said functional fibrous substrate.

Preferably the impregnation of the fibrous substrate in step a) is made in a closed mold.

Advantageously the step a) and step b) are made in the same closed mould.

The mold is opaque towards visible and ultraviolet radiation at least on one side A closed mold will amongst other things avoid and reduce the evaporation of the monomer and protect the environment.

Using the same closed mold will avoid the transfer of the material after impregnation and polymerizing in a closed mold will guarantee a good distribution of the heat, having a satisfying yield of polymerization and eventually evaporation of the monomer(s).

No metals are present in manufactured mechanical or structured parts or articles such as tin are present coming from accelerators added for the polymerization step.

The manufactured mechanical or structured parts or articles do not contain any additional solvent voluntary added, since the syrup did not contain any additional solvent for the impregnation step.

With regard to the manufactured mechanical or structured parts or articles of the present invention, it comprises at least 20% by weight of functional fibrous substrate, preferable at least 40% by weight of functional fibrous material advantageously at least 50% by weight of functional fibrous material and advantageously at least 55% by weight of functional fibrous material based on the total composition.

The manufactured mechanical or structured parts or articles of the present invention, it comprises at most 99% by weight of functional fibrous material, preferable at most 95% by weight of functional fibrous material advantageously at most 90% by weight of functional fibrous material and advantageously at most 80% by weight of functional fibrous material based on the total composition.

Due to the manufacturing process for manufacturing mechanical or structured parts or articles according to the invention a complete, correct and homogenous wetting of the fibrous substrate during impregnation takes place. There are no defects of fiber wetting during impregnation for example by bubbles and voids that decrease the mechanical performance of the manufacturing mechanical or structured parts or articles.

The manufactured mechanical or structured parts or articles according to the invention do not comprise essentially any pores. By pore is meant a spherical void with a diameter of at least fpm or larger or an elongated ellipsoidal void in form of an oblate with a smallest principal axe of at least 0.5 µm or larger. By "comprising essentially no pores" is meant that the pores represent less then 1 vol %, preferably less then 0.5 vol % and more preferably less then 0.2 vol % of the total volume of the manufactured mechanical or structured parts or articles.

With regard to manufacturing process for manufacturing mechanical or structured parts or articles comprising the polymeric composite material, several methods could be used in order to prepare three-dimensional mechanical or structured parts. One can mention infusion, vacuum bag moulding, pressure bag molding, autoclave molding, resin transfer moulding (RTM), reaction injection molding (RIM) reinforced reaction injection molding (R-RIM) and variants thereof, press molding or compression molding.

The preferred manufacturing process for manufacturing mechanical or structured parts or articles comprising the composite materials are processes were the liquid monomer syrup or preferred (meth)acrylic syrup transferred to the functional fibrous substrate by impregnating the functional fibrous substrate in a mold more preferably in a closed mold.

Advantageously the impregnation step of the fibrous material is made in a closed mold.

Most advantageously the manufacturing process for manufacturing mechanical or structured parts or articles comprising the polymeric composite material is chosen from resin transfer molding or infusion.

All processes comprise the step of impregnating the fibrous substrate with the liquid (meth)acrylic syrup before the polymerization step in a mold.

The step of polymerising of the liquid (meth)acrylic syrup impregnating said fibrous substrate takes place after the impregnation step in the same mold.

Resin transfer molding is a method using a two sided mold set which forms both surfaces of composite material. The lower side is a rigid mould. The upper side can be a rigid or flexible mould. Flexible moulds can be made from composite materials, silicone or extruded polymer films such as nylon. The two sides fit together to produce a mould cavity. The distinguishing feature of resin transfer moulding is that the fibrous substrate is placed into this cavity and the mould set is closed prior to the introduction of the liquid (meth)acrylic syrup. Resin transfer moulding includes numerous varieties which differ in the mechanics of how the liquid (meth)acrylic syrup is introduced to the fibrous substrate in the mould cavity. These variations include everything from vacuum infusion to vacuum assisted resin transfer moulding (VARTM). This process can be performed at either ambient or elevated temperature. Ambient temperature means between 10° C. and 50° C. Elevated temperature means up to 200° C. Preferably elevated temperature is from 50° C. up to 160° C.

With the infusion method the liquid (meth)acrylic syrup does have to have the adapted viscosity towards this preparation method of the polymeric composite material. The liquid (meth)acrylic syrup is aspired into the fibrous substrate present in a special mold by application of a slight vacuum. The fibrous substrate is infused and completely impregnated by the liquid (meth)acrylic syrup.

One advantage of this method is the high amount of fibrous material in the composite.

With regard to the use of manufactured mechanical or structured parts or articles, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is a automobile part, boat part, train part, sport article, plane or helicopter part, space ship or rocket part, photovoltaic module part, wind turbine part, furniture part, construction or building part, telephone or cell phone part, computer or television part, printer and photocopy part.

With regard to the recycling of the structured part, comprising the thermoplastic composite material it can be made by grinding or depolymerization of the thermoplastic polymer.

Grinding is made mechanically in order to obtain smaller parts of pieces. As the structured part compromises thermoplastic polymer, this polymer can be heated, and the pieces again transformed in a certain limit in order to obtain a recycled object.

So, a final subject of the present invention relates to the use of the impregnation process or of the manufacturing process according to the invention, particularly when the said methacrylic polymer is an homopolymer or/and a copolymer of methyl methacrylate, in the manufacture of mechanical and/or structural parts which are recyclable by thermal depolymerisation (by means of pyrolysis), preferably with at least 50% of the monomers, particularly of methyl methacrylate (MMA) recovered.

Methods

The weight fraction of the fibres in the composite material is obtained by the norm NF EN ISO 1172 Avril 1999 ("Plastiques renforcés de verre textile—Préimprégnés, compositions de moulage et stratifiés—Détermination des taux de verre textile et de charge minérale Méthodes par calcination")

The mechanical properties in traction are characterized by following the norm EN 2597:1998 (Carbon fibre reinforced plastics. Unidirectional laminates. Tensile test perpendicular to the fibre direction) for obtaining the stress at break.

IR spectra are obtained with a FTIR apparatus Nicolet 6700 from Thermoscientific, measuring a point at an interval of 2 cm−1

EXAMPLES

Example A for Syrup Preparation

A syrup is prepared by dissolving 25 parts by weight of the PMMA (BS520 a copolymer of MMA comprising ethyl acrylate as a comonomer) in 75 parts by weight of methyl methacrylate, which is stabilized with MEHQ (hydroquinone monomethyl ether). To the 100 parts by weight of the syrup are added 2 parts by weight of benzoyl peroxide (BPO—Luperox A75 from ARKEMA) and 0.2 parts by weight of DMPT (N,N-dimethyl-p-toluidine from Sigma-Aldrich). The syrup has a dynamic viscosity of 520 mPa*s at 25° C.

Example B

Preparation of thermoplastic materials with syrup from example A and different fibrous materials. As fibrous materials carbon fibres are used: an unidirectional ply of carbon fibres T700SC 12K 60E and T700SC 12K MOE, both from the company Toray CFE.

Both plies are extracted by washing with CS2. The samples are deposed at respective KBr pellet and dried at room temperature.

The IR spectrum of the sample obtained from T700SC 12K MOE comprises peaks at following wave numbers: 1721 cm−1 (carbonyl), 1637 cm−1 (doublebond) and a double peak at 1296-1320 cm−1 (methyl group on a doublebond). This fibre possesses a methacrylic functionality. The IR spectrum of the sample obtained from T700SC 12K E60 does not comprise peaks at following wave numbers: 1721 cm−1, 1637 cm−1 and a double peak at 1296-1320 cm−1.

Comparative Example 1

The syrup is injected in a closed mould comprising a ply of fibrous substrate made of carbon fibres T700SC 12K 60E from the company Toray CFE. After complete impregnation the syrup is polymerized at 25° C. during 80 minutes.

Example 1

The syrup is injected in a closed mould comprising a ply of fibrous substrate made of carbon fibres T700SC 12K MOE from the company Toray CFE. After complete impregnation the syrop is polymerized at 25° C. during 80 minutes.

Structural parts in form of 2 mm thick sheets are obtained from the mould.

The sheet has a good adherence of the thermoplastic polymer to the fibrous substrate.

A Tensile test perpendicular to the fibre direction according to the norm EN 2579 is performed on the sheets obtained in the two examples. Especially the stress at break is measured. Comparative example 1 has a stress of break of 18 MPa while the example 1 has a stress of break of 58 MPa.

The sheet possesses also satisfying mechanical properties.

After utilisation the structural part in form of a sheet can be recycled by heating and depolymerisation.

The invention claimed is:

1. An impregnation process for impregnating a functional fibrous substrate, wherein said functional fibrous substrate is made of long fibres having an aspect ratio of at least 1000, said fibers having a diameter between 0.005 micrometers and 100 micrometers, and said process comprises a step of impregnating said functional fibrous substrate with a liquid monomer syrup comprising:
   a) at least a polymer (P), wherein the polymer (P) comprises a thermoplastic (meth)acrylic polymer,
   b) at least monomer (A), wherein the monomer (A) comprises a methacrylic monomer,
   c) at least one initiator or initiating system for starting the polymerization of the monomer (A),
said liquid monomer syrup has a dynamic viscosity of a value in the range from 10 mPa*s to 10000 mPa*s, wherein the functional fibrous substrate comprises a methacrylic functionality having an IR absorption peak at a wave number between 1600 cm$^{-1}$ and 1680 cm$^{-1}$ representing an alkene or carbon double bond, and an IR absorption peak at a wave number between 1700 cm$^{-1}$ and 1750 cm$^{-1}$ representing a carbonyl ester, and wherein said functional fibrous substrate consists of one or more fibers selected from the group consisting of fibers of thermosetting polymers, fibers of thermoplastic polymers, polyamide fibers, polyester fibers, polyvinylacohol fibers, polyolefin fibers, polyurethane fibers, polyvinylchloride fibers, polyethylene fibers, unsaturated polyester fibers, epoxy resin fibers, vinylester fibers, glass fibers, boron fibers, silica fibers, and mixtures thereof, wherein said functional fibrous substrate is completely and homogeneously impregnated with said liquid monomer syrup.

2. The impregnation process according to claim 1 wherein the functional fibrous substrate comprises an additional functionality having an IR double absorption peak at a wave number between 1270 cm$^{-1}$ and 1330 cm$^{-1}$ centred around 1300 cm$^{-1}$.

3. The impregnation process according to claim 1, wherein the (meth)acrylic polymer is a homo- or copolymer of methyl methacrylate (MMA) or a mixture thereof.

4. The impregnation process according to claim 3 wherein the copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate.

5. The impregnation process according to claim 1 wherein the copolymer of methyl methacrylate (MMA) comprises at least 70% by weight of methyl methacrylate (MMA).

6. The impregnation process according to claim 2 wherein the (meth)acrylic monomer is chosen from acrylic acid, methacrylic acid, alkyl acrylic monomers, alkyl methacrylic monomers and mixtures thereof, the alkyl group having from 1 to 22 carbons, either linear, branched or cyclic.

7. The impregnation process according to claim 2 wherein the (meth)acrylic monomer is selected from the group consisting of methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

8. The impregnation process according to claim 1 wherein the (meth)acrylic monomer is chosen from methyl methacrylate, isobornyl acrylate or acrylic acid and mixtures thereof.

9. The impregnation process according to claim 1 wherein at least 50 wt % of the (meth)acrylic monomer is methyl methacrylate.

10. The impregnation process according to claim 1 wherein said initiator or initiating system for starting the polymerization of the (meth)acrylic monomer is generating radicals.

11. The impregnation process according to claim 1 wherein said initiator or initiating system for starting the polymerization of the (meth)acrylic monomer is chosen from diacyl peroxides, peroxy esters, dialkyl peroxides, peroxyacetals, hydro peroxides, azo compounds or mixtures thereof.

12. The impregnation process according to claim 1 wherein said initiator or initiating system for starting the polymerization of the (meth)acrylic monomer is chosen from peroxides having 2 to 20 carbon atoms.

13. The impregnation process according to claim 1 wherein the liquid monomer syrup further comprises an activator.

14. The impregnation process according to claim 1 wherein polymer (P) in the liquid monomer syrup comprises at least 10% by weight of the total liquid monomer syrup.

15. The impregnation process according to claim 1 wherein polymer (P) in the liquid monomer syrup comprises at most 60% by weight of the total liquid monomer syrup.

16. The impregnation process according to claim 1 wherein the monomer (A) in the liquid monomer syrup comprises at least 40% by weight of the total liquid monomer syrup.

17. The impregnation process according to claim 1, wherein the liquid (meth)acrylic syrup comprises:
a) from 10 wt % to 59.99 wt % the at least a polymer (P),
b) from 40 wt % to 89.99 wt % the at least monomer (A),
c) from 0.01 wt % to 5 wt % of one initiator or initiating system for starting the polymerization of the (meth) acrylic monomer,
d) from 0 wt % to 1 wt % activator,
e) from 0 wt % to 20 wt % filler, and
f) from 0 wt to 20 wt % additives.

18. The impregnation process according to claim 1 wherein the liquid (meth)acrylic syrup comprises:
a) from 10 wt % to 59.98 wt % of at least a polymer (P),
b) from 40 wt % to 89.98 wt % of at least monomer (A),
c) from 0.01 wt % to 5 wt % of one initiator or initiating system for starting the polymerization of the (meth) acrylic monomer,
d) from 0.1 wt % to 1 wt % activator,
e) from 0 wt % to 20 wt % filler, and
f) from 0 wt to 20 wt % additives.

19. A manufacturing process for manufacturing mechanical or structured parts or articles comprising the following steps:
a) impregnating a functional fibrous substrate with a liquid monomer syrup according to claim 1,
b) polymerising the liquid monomer syrup impregnating said functional fibrous substrate.

20. The process according to claim 19, wherein the impregnation of the functional fibrous substrate in step a) is made in a closed mold.

21. The process according to claim 19 wherein step a) and step b) are made in the same closed mold.

22. The process according to claim 19 wherein the process is chosen from resin transfer molding and infusion.

23. The process according to claim 19 wherein the temperature of the polymerization is step b) is below 40° C.

24. Three-dimensional mechanical or structured parts obtained by the manufacturing process according to claim 19.

25. Part according to claim 24, which is a automobile part, boat part, train part, sport article, plane or helicopter part, space ship or rocket part, photovoltaic module part, wind turbine part, furniture part, construction or building part, telephone or cell phone part, computer or television part, printer and photocopy part.

26. The impregnation process according to claim 1 wherein said fibers consist of glass fibers.

* * * * *